(12) United States Patent
Fuda et al.

(10) Patent No.: US 6,540,497 B1
(45) Date of Patent: Apr. 1, 2003

(54) SECONDARY MOLDING APPARATUS FOR PROTRUSIONS OF SYNTHETIC RESIN ERECTED ON A SURFACE OF A FLAT BASE MATERIAL

(75) Inventors: Masaaki Fuda, Toyama-ken (JP); Shinichi Daijyogo, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/490,753

(22) Filed: Jan. 24, 2000

(30) Foreign Application Priority Data

Feb. 8, 1999  (JP) .......................................... 11-029852

(51) Int. Cl.[7] .............................................. B29C 43/34
(52) U.S. Cl. .................. 425/174.2; 425/327; 425/385; 425/814
(58) Field of Search ............................. 425/174.2, 327, 425/385, 814, 394; 264/443, 444

(56) References Cited

U.S. PATENT DOCUMENTS

| | | | |
|---|---|---|---|
| 3,730,817 A | * | 5/1973 | Frohlich et al. ............. 156/580 |
| 4,252,586 A | * | 2/1981 | Scott ........................ 156/73.1 |
| 4,325,769 A | * | 4/1982 | Moyse et al. ................ 156/217 |
| 4,693,859 A | | 9/1987 | Held ......................... 264/112 |
| 4,747,895 A | * | 5/1988 | Wallerstein et al. ........ 156/73.3 |
| 5,039,462 A | * | 8/1991 | Chilko et al. .................. 264/23 |
| 5,245,154 A | * | 9/1993 | Sato et al. ................ 219/10.81 |
| 5,755,015 A | | 5/1998 | Akeno et al. .................. 24/452 |
| 5,781,969 A | | 7/1998 | Akeno et al. .................. 24/452 |
| 5,800,845 A | | 9/1998 | Akeno et al. ................ 425/224 |
| 5,913,482 A | * | 6/1999 | Akeno ......................... 24/452 |

FOREIGN PATENT DOCUMENTS

| | | |
|---|---|---|
| EP | 0811332 A2 | 12/1997 |
| GB | 2084242 A | 4/1982 |
| GB | 2305388 A | 4/1997 |
| JP | 7001487 | 1/1995 |

* cited by examiner

Primary Examiner—Jan H. Silbaugh
Assistant Examiner—Joseph S Del Sole
(74) Attorney, Agent, or Firm—Finnegan, Henderson, Farabow, Garrett & Dunner, L.L.P.

(57) ABSTRACT

A secondary molding apparatus includes a transfer path for a primary molded product, and an internal heating unit disposed vertically at a predetermined interval across the transfer path, the internal heating unit disposed to come into contact with a rear surface of a flat base material and to melt top portions of protrusions located on a front surface of the flat base material. The secondary molding apparatus also includes a pressing member disposed vertically at a predetermined interval across the transfer path, the pressing member configured to press and deform the top portions of the protrusion to a desired shape, the pressing member being a non-heating member.

2 Claims, 4 Drawing Sheets

SECONDARY MOLDING APPARATUS FOR PROTRUSIONS OF SYNTHETIC RESIN ERECTED ON A SURFACE OF A FLAT BASE MATERIAL

BACKGROUND OF THE INVENTION

1. Field of the Invention

The present invention relates to a secondary molding apparatus for forming a final product by melting and deforming a top portion of each of protrusions of a primary molded product having a plurality of the protrusions erected on a surface of a flat base material made of thermoplastic synthetic resin.

2. Description of the Related Art

According to Published Japanese Translations of PCT International Publication No. 8-508910, Japanese Patent Application Laid-Open No. 9-322811 and No. 9-322812, a primary product having a plurality of protrusions erected integrally on the surface of a flat base material is continuously molded of thermoplastic synthetic resin and then the base material is transferred through a transfer path. Meanwhile, the base material is supported from below in a secondary molding area provided halfway of the transfer path, and a top portion of each of the protrusions is heated and pressed by a heating/pressing unit such as a heating roller, a heating plate or the like so that it is deformed. As a result, for example,. male members of a surface fastener are molded.

According to the aforementioned Publication No. 8-508910, molten resin is supplied from an extruder or the like to the surface of a rotating cylinder having a plurality of blind holes formed in a circumferential face along an axis and in the circumferential direction such that they are directed linearly toward the axis. Part of the molten resin is pressed into the blind holes so as to mold each protrusion. At the same time, flat base material is molded with the molten resin continuously on the surface of the cylinder integrally with proximal ends of the protrusions. This continuously molded product is supported by a surface of the rotating cylinder and cooled while it is rotated. Then, after being separated from the cylinder, the male surface fastener primary product is obtained. This male surface fastener primary product is transferred to the secondary molding area, in which a circular engaging head portion whose top surface is dented is molded on a tip end of each protrusion erected on the surface of the base material so that the male surface fastener as a final. product is produced.

On the other hand, as disclosed in the aforementioned Japanese Patent Application Laid-Open No. 9-322811 and No. 9-322812, a plurality of V-shaped or Y-shaped blind holes are formed in the circumferential surface of the rotating cylinder like the above described example. The primary molded product of the male surface fastener is molded by a rotation of the cylinder as described above, and after that, the tip end of the V-shaped or Y-shaped protrusion erected on the surface of the base material is heated and pressed in the secondary molding area so that it is deformed. As a result, the engaging head portion having a peculiar shape in which the tip portion of each of the protrusions erected from the surface of the base material is deformed to substantially inverse L shape or substantially T shape, and expanding portions expanding horizontally to the right and left on the tip portion is molded so as to produce the male surface fastenet as the final product.

According to production methods for the male surface fasteners disclosed in the patent publications, because an engaging element each having a peculiar engaging head portion is molded, although an engaging force thereof is lower than that of a conventional mushroom-shaped engaging element, minute engaging elements can be molded in a high density since the protrusion of the primary molded product has a simple configuration. For example, this is effective for an engaging/disengaging device of a disposable diaper. Particularly, in the engaging element formed in a substantially inverse L shape or substantially T shape, having an engaging head portion with horizontally expanding portions molded at a tip thereof, the engaging head portion itself has a higher stiffness than the other portions of the engaging element. Therefore, a necessary engaging force and some extent of separation resistance are secured with the existence of the expanding portions.

On the other hand, deformation of the aforementioned protrusion of the primary molded product which comes into contact with a heating member such as a heating roller and a heating plate disposed on the pressing side of the heating/pressing unit installed in the secondary molding area is determined depending on the heating temperature and contact time of the heating member. When it is intended to press and deform the engaging element to desired shape, the pressing force needs to be controlled to be optimum as well as the heating time and contact time. Further, in order to make the secondary molding speed adapt to the primary molding speed, the secondary molding speed has to be high. For this purpose, a desired thermal capacity and heating source have to be secured. As a result, multi-purpose control system is needed so that inevitably the apparatus is enlarged thereby a large installation space being required.

SUMMARY OF THE INVENTION

The present invention has been accomplished to solve the above problems, and therefore, an object of the present invention is to provide a secondary molding apparatus for molding protrusions of synthetic resin erected on the surface of a flat base material, which can be installed in a small installation space and in which the secondary molding speed can be changed arbitrarily and no useless heat history is given to other portions than a portion to be deformed upon deformation.

The above object of the invention can be achieved as described below.

There is provided in this invention a secondary molding apparatus for molding a top portion of each of a plurality of protrusions of a primary molded product having the protrusions integrally erected on the surface of a flat base material to a desired shape by melting and deforming the top portion thereof, the secondary molding apparatus for molding the protrusions of synthetic resin erected on the surface of the flat base material, comprising: a transfer path for the primary molded product; and a pressing member and an internal heating unit disposed vertically at a predetermined interval across the transfer path, wherein the pressing member is disposed at a position in which it presses and deforms the top portion of the protrusion and the internal heating unit is disposed at a position in which it comes into contact with a rear surface of the flat base material.

The primary molded product having a plurality of the protrusions erected on the surface of the flat base material molded by the primary molding apparatus is supplied continuously through the transfer path to the secondary molding apparatus. In the primary molded product supplied to the secondary molding apparatus, the rear surface of the flat base material is supported by the internal heating unit and the top end of the protrusion erected on the surface of the flat base material is pressed by the pressing member. The internal heating unit mentioned here means a unit for heating the synthetic resin molded product by itself as a heat generating body. This internal heating unit intensively heats the top end of the protrusion pressed by the pressing member. Therefore, thermal capacity is concentrated on only the molten and deformed portion, so that molding is enabled without giving unnecessary heat history to other portions. Further, because the internal heating unit is capable of controlling a local heating speed easily and allows quick heating/cooling, molding temperature and molding speed can be controlled arbitrarily. Therefore, the secondary molding suitable for a molding speed of the primary molded product can be achieved.

Preferably, use of the ultrasonic oscillator or high frequency oscillator is provided as the internal heating unit. Because these internal heating units are capable of securing a desired heating speed and temperature without enlarging the size of the internal heating unit, the installation space can be reduced, a desired molding speed can be obtained and the above described function effect can be exhibited sufficiently.

Further preferably, the pressing member is provided, and still preferably, a rotating roller supported by a shaft disposed perpendicular to a direction of crossing the transfer path is employed as the pressing member. Further preferably, a sheet material including an area in which a gap relative to the transfer path decreases gradually is employed. Because the heating area for-the secondary molded product heated by the internal heating unit is concentrated on the pressing area pressed by the pressing member, the heating speed may be increased quickly, thereby the molding speed is increased. As a result, regardless of whether the rotating roller or the sheet material is used, the size of the secondary molding apparatus is reduced effectively as compared to the conventional one.

DESCRIPTION OF THE PREFERRED EMBODIMENTS

Figure 1:
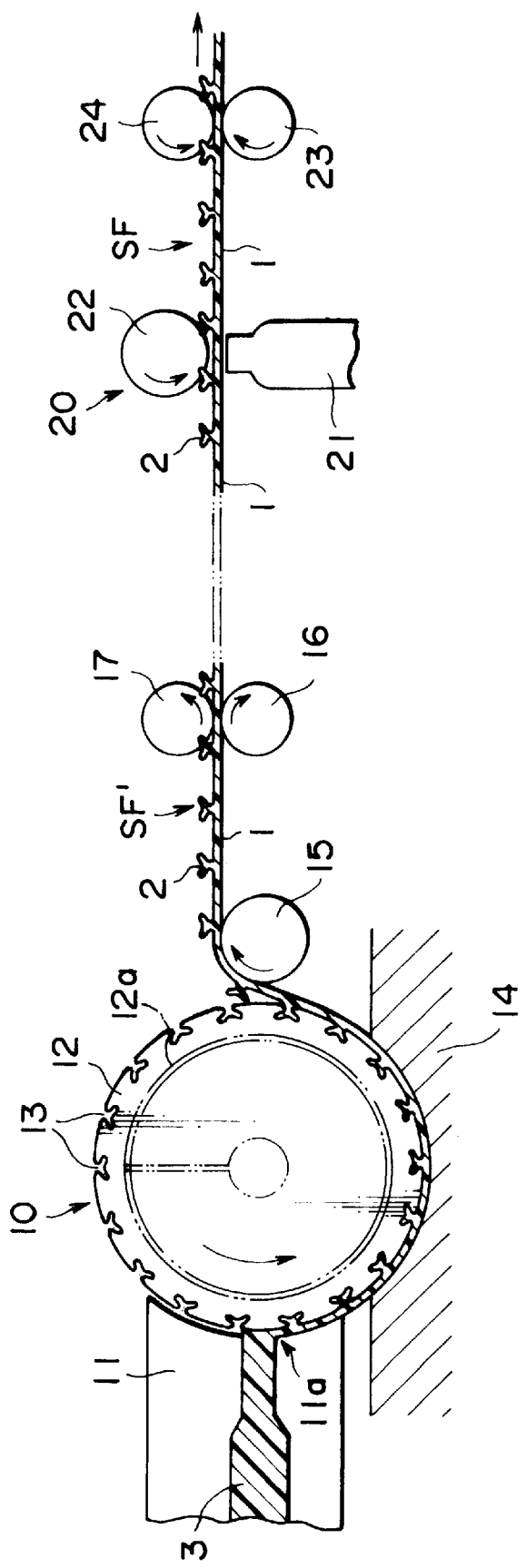
FIG. 1 is an explanatory diagram when a secondary molding apparatus having an internal heating unit according to a typical embodiment of the present invention is applied to a molded surface fastener manufacturing machine.

Hereinafter, the preferred embodiments of the present invention will be described in detail with reference to the accompanying drawings. FIG. 1 shows schematically a manufacturing machine for a molded surface fastener, having a secondary molding apparatus according to a typical embodiment of the present invention. This molded surface fastener has a plurality of male engaging elements formed in, for example, a hook shape, erected on a surface of a flat base material as described in detail later, and this molded surface fastener engages with/disengages from a female surface fastener having a plurality of loop like engaging elements erected on a surface of a mating flat base material.

According to this embodiment, the manufacturing machine for the molded surface fastener comprises a primary molding apparatus 10 for molding a primary molded product SF' of the molded surface fastener SF and a secondary molding apparatus 20 for producing a molded surface fastener SF which is a final product by secondary-molding the primary molded product SF' molded by the primary molding apparatus 10. Here, the primary molding apparatus 10 for the molded surface fastener SF is substantially similar to the primary molding apparatus disclosed in Japanese Patent Application Laid-Open No. 9-322811 and No. 9-322812 previously developed by the same inventor of this invention. Therefore, the primary molding apparatus will only be described schematically.

The primary molding apparatus 10 has a continuous injection nozzle 11 and a die wheel 12. An end of the injection nozzle 11 is a circular face having substantially the same curvature as that of the die wheel 12. The injection nozzle 11 is disposed to oppose a curved surface of the die wheel 12 with a gap corresponding to the thickness of the flat base material 1 of the primary molded product SF' to be molded. Molten resin 3 is injected in form of a sheet continuously under a predetermined resin pressure and at a constant flow rate through a resin injection port 11a formed in the center of the curved surface at the end of the injection nozzle 11.

The die wheel 12 is formed in a hollow drum shape having a water-cooling jacket 12a which is internal cooling means. A plurality of donut-shaped plate materials are overlaid and fixed along an axis thereof so as to form the die wheel 12. A circumferential face thereof has a function for molding part of a surface of the primary molded product SF'. Then, the aforementioned gap is secured between the circular face at the end of the injection nozzle 11 and the die Wheel 12, and an axis of the die wheel 12 is set up in parallel to the injection port 11a. A plurality of rows of the engaging element molding cavities 13 disposed in the circumferential direction are formed along a rotating axis at a predetermined interval on the circumferential surface of the die wheel 12. Each of the engaging element molding cavities 13 has a configuration curved in substantially Y shape inside the die wheel 12. The die wheel 12 having such a structure is driven and rotated in a direction indicated by an arrow in FIG. 1 by a known driving unit (not shown).

A water-cooling bath 14 is provided below the die wheel 12 so that a lower portion of the die wheel 12 is immersed inside the water-cooling bath 14. A take-up roll 15 is disposed obliquely in upper front of this cooling water bath 14 and a pair of first feed rolls 16, 17 having upper and lower rolls are provided in front of the take-up roll 15. Further, a trimming unit (not shown) having cutting means for cutting off ear portions of the primary molded product SF' which is a base material of the molded surface fastener SF which is to be secondary molded and which is a final product of the present invention is provided. A plurality of concave grooves (not shown) are formed in parallel rows in the circumferential direction on a circumferential surface of the upper roll 17 of the pair of the first feed rolls 16 and 17. As a result, when the primary molded product SF' is transferred, it is transferred with the engaging element 2 which is a protrusion erected on the surface of the flat base material 1 fit into the concave groove.

In order to mold the primary molded product SF' with the primary molding apparatus having such a structure, molten resin injected continuously from the injection nozzle 11 at a predetermined resin pressure is introduced continuously into the gap formed between the injection nozzle 11 and the rotating die wheel 12. At this time, part of the molten resin is filled in the gap so as to mold the base material 1 and at the same time, it is filled successively in the engaging element molding cavities 13 formed in the circumferential surface of the die wheel 12. As a result, with a rotation of the die wheel 12, the primary molded surface fastener SF' having a plurality of the engaging elements 2 molded integrally on the surface of the base material 1 thereof is continuously molded.

On the circumferential surface of the die wheel 12, the primary molded product SF' having the primary configuration which is a base material of the molded surface fastener as a final product is guided along a substantially half circumferential surface of the die wheel 12 by the take-up roll 15 so that it is rotated. Meanwhile, the primary surface fastener SF' is cooled positively by the water-cooling jacket 12a from inside of the die wheel 12 and passed through the inside of the water-cooling bath 14 in which cooling water at a low temperature (substantially 15° C.) circulates so that it is cooled rapidly and hardening thereof is accelerated. By rapid cooling, the primary molded product SF' is hardened before crystallization proceeds, and the base material 1 and engaging element 2 become entirely flexible.

When the base material 1 hardened in this way is pulled out by the first feed rolls 16 and 17, each of the substantially Y-shaped engaging elements molded and hardened by cooling in the engaging element molding cavity 13 is extracted from the cavity 13 smoothly in a condition in which it is deformed linearly. At this time, although the engaging element 2 intends to return to its original shape, the shape is not restored completely, so that the configuration of the engaging head portion 2b is slightly more erected in terms of its bending angle from an erected portion 2a than the substantial Y-shape of the engaging element molding cavity 13.

Figure 2:
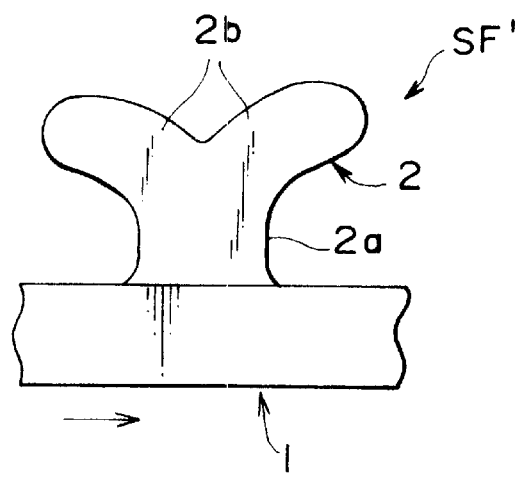
FIG. 2 is a side view showing a configuration of a primary molded product molded with the primary molding apparatus applied to the manufacturing machine.

FIG. 2 shows an example of an embodiment of the primary molded product of the molded surface fastener SF molded with the primary molding apparatus. As shown in the Figure, the entire engaging elements 2 are substantially Y shaped, consisting the erected portion 2a which is erected on the surface of the base material 1, and the engaging head portion 2b which are branched back and forth in the molding direction from the erected portion 2a such that they stand up linearly while inclined with respect to each other.

In the same Figure, an arrow indicates a molding direction. The engaging head portion 2b extending forward in the molding direction is raised more than the engaging head portion extending backward as shown in the Figure, because of a difference of the deformation amount of the engaging element being extracted from the Y-shaped cavity 13 when the primary molded product SF' is peeled off from the die wheel 12. The primary molded product SF' molded in this way is transferred to the secondary molding apparatus 20 of the present invention.

Therefore, according to the present embodiment, as shown in FIG. 1, the secondary molding apparatus 20 having an internal heating unit 21 of the present invention is provided in front of the pair of the feed rolls 16 and 17. Further, a pair of the second feed rolls 23 and 24 having upper and lower rolls, are disposed in front thereof. The secondary molding apparatus 20 consists the internal heating unit 21 and pressing roll 22. The pressing roll 22 is disposed above and the internal heating unit 21 is disposed beneath across the primary molded product SF' being transferred by the first and second pairs of the feed rolls 16 and 17; 23 and 24.

According to this embodiment, a ultrasonic tool horn is employed as the internal heating unit 21. A high frequency electrode die may be used instead of this ultrasonic horn. In the internal heating unit 21, only an internal part of a pressed portion of the resin molded portion pressed by the pressing roll 22 is heated quickly and deformed. Thus, portions other than the deformed portion is not affected by heating. Therefore, the physical property of the resin molded portion other than the deformed portion is not changed from its initial state. Thus, according to this invention, it is not necessary to consider an influence by heating in portions other than the deformed portion which is generated by regular external heating.

In the internal heating unit 21, an acting surface thereof is disposed on a transfer path for the primary molded product SF' such that the primary molded product SF' being transferred is supported from below. A bottom end of the circumferential face of the pressing roll 22 is disposed so as to be located slightly below a plane in which an end of the engaging head portion 2b of the primary molded product SF' passes. Setting of the position at this time is determined by a scheduled dimension of expanding portion 2c expanding to the right and the left from a top portion 2b' of the engaging head portion 2b of a final product which will be described later. On the other hand, a top face of the internal heating unit (ultrasonic tool horn) 21 disposed to face the bottom of the pressing roll 22 is provided so as to be located on a plane in which a bottom face of the base material 1 of the primary molded product SF' is transferred.

Figure 3:
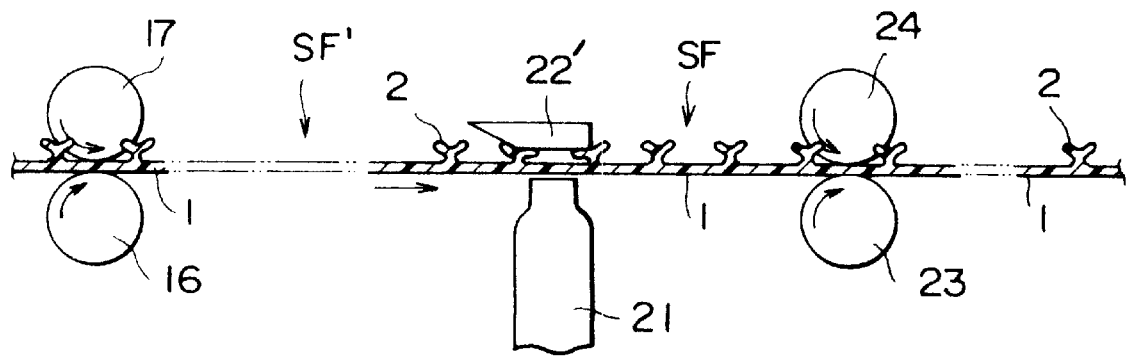
FIG. 3 is a side view showing another example of pressing member of the secondary molding apparatus.

A supporting position of the pressing roll 22 can be adjusted with height adjusting means (not shown). A heating temperature and heating speed of the internal heating unit 21 can be controlled easily by an applied electrical power. Further, on contrary to external heating with a conventional heating roll or heating plate, because a quick heating is possible, secondary molding is enabled synchronously with a molding speed of the primary molded product. Further, because heating can be concentrated locally, the pressing member such as the pressing roll 22 can be reduced in size so that an internal heating unit installation space can be reduced largely as well as the internal heating unit. The pressing roll 22 is driven and positively rotated synchronously with the transfer speed of the molded product. Further, instead of the pressing roll 22, a flat plate material 22' in which an introducing portion of the primary molded product SF' is a downward inclined surface as shown in FIG. 3 may be employed.

The ear portions existing on the right and left in a width direction of the primary molded product SF' molded in the above manner are cut off with a trimming unit (not shown) and transferred to the secondary molding apparatus 20 of the present invention. According to this embodiment, when the primary molded product SF' is passed between the internal heating unit 21 and the pressing roller 22, the top portion 2b' of the engaging head portion 2b of the engaging element 2 is pressed by the pressing roller 22 and at the same time, an ultrasonic (high frequency) vibration is applied to the internal heating unit 21 from the rear surface of the base material 1. As a result a portion in contact with the pressing roll 22 is heated quickly so that the engaging head portion 2b falls down from its proximal end up to its distal end and simultaneously, a top portion thereof is softened and deformed so that a top surface becomes substantially flat surface P and the expanding portion 2c expanding to the right and left sides is formed. As a result, a final configuration of the engaging element 2 can be obtained. Depending on molding condition, the top flat surface P may be formed such that a center portion thereof is slightly dented by subsequent cooling.

Figure 4:
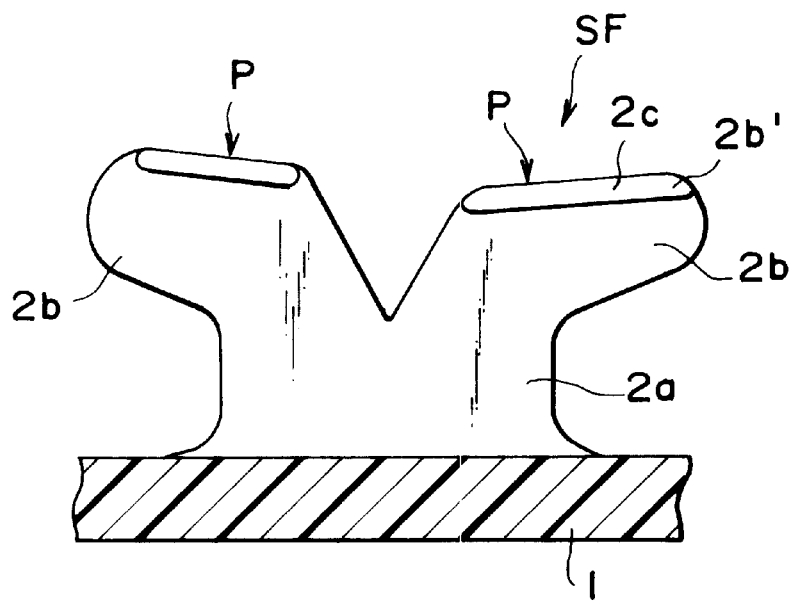
FIG. 4 is a partial side view showing a configuration of a male molded surface fastener which is a final product after the secondary molding with the secondary molding apparatus.
Figure 5:
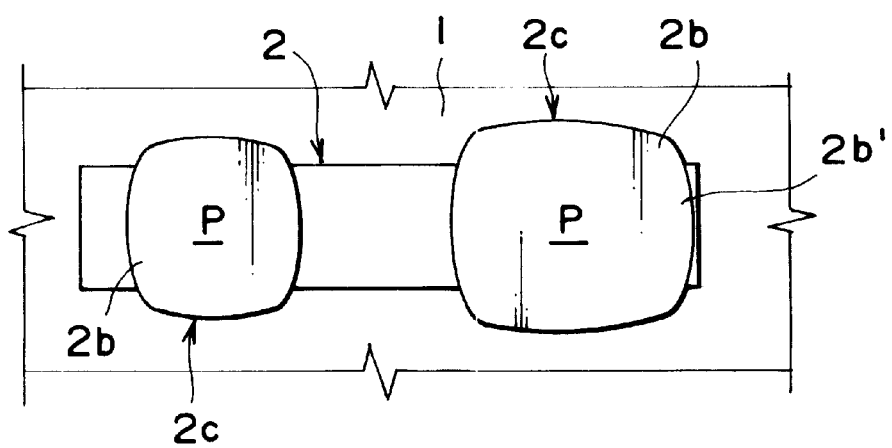
FIG. 5 is a partial plan view of the male molded surface fastener.

According to this embodiment, because the engaging head portion 2b is extended back and forth, a portion on which the pressing toll 22 acts is different between the engaging head portions 2b located back and forth. That is, the engaging head portion 2b extending forth is pressed gradually along the surface from its distal end to its proximal end, while the engaging head portion 2b extending back is pressed gradually along the surface from its proximal end up to its distal end. As a result, as shown in FIGS. 4 and 5, the engaging head portions 2b are molded differently, and the engaging head portion 2b extending forth is crushed largely than the engaging head portion 2b extending back so that the plane expansion of the flat surface P and expanding portion 2c is larger than the engaging head portion 2b extending back. The difference of the configuration between the engaging head portions 2b can be effective depending on the configuration of the engaging element of a mating female surface fastener.

That is, although not provided in the present invention, the male surface fastener which is the secondary molded product is used as, for example, an engaging/disengaging device for a disposable diaper or the like. In this case, the size of the aforementioned engaging element 2 is very small and as a mating female surface fastener, an ordinary unwoven fabric with loops not so long is used. As known well, in this ordinary unwoven fabric, the sizes of the loops exposed on the surface thereof are not equal but diversified. Considering an ease of engaging with loop different in size and its engaging strength, a single engaging element having two engaging head portions each having a different size means that a probability of engaging with various sizes of the loops increases, so that an entire engaging force is improved.

No special cooling means is employed for the male surface fastener SF which is a secondary molded product obtained by passing between the internal heating unit 21 and the pressing roll 22, but it is gradually cooled under a normal temperature and then wound up to complete the production. At this time, softening the top portion of the engaging element 2 by heating it intensively and at the same time pressing, and then not quickly but gradually cooling the engaging element 2 having a substantially flat top surface and expanding portions 2c on the right and left sides as described above, have an important meaning. That is, when the top portion 2b' of the engaging head portion 2b softened by heating and deformed by pressing is cooled and hardened gradually so that crystallization of the heated portion is accelerated, stiffness of the top portion 2b' including the expanding portions 2c of the engaging head portion 2b becomes higher than other portions in the erected portion 2a and engaging head portion 2b.

Because, in the base material 1 and engaging element 2 of the primary molded product SF' having an excellent flexibility by quick hardening, only part of the engaging head portion 2b has more stiffness than the other portions, even when the engaging element 2 of a molded surface fastener SF is very small and has a very high flexibility, the stiffness of the engaging head portion 2b is secured. That means that a holding force with respect to the mating loop piece in a direction of separating is secured.

An existence of the expanding portions 2c produces various useful functions not expected in the configuration of a conventional simple engaging element. As those specific functions based on the configuration of the engaging element according to the above embodiment have been disclosed in detail in the above described patent publication, a description thereof is omitted here.

Figure 6:
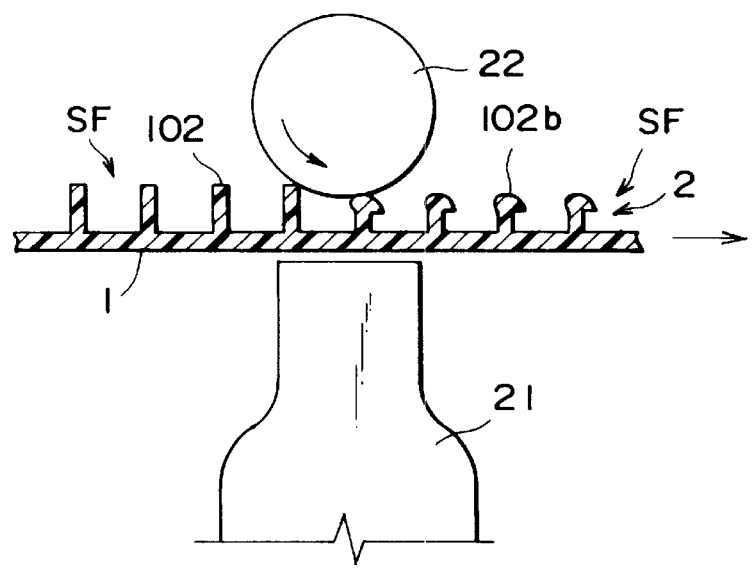
FIG. 6 is a side view showing another example of the secondary molding process.

The secondary molding apparatus 20 of the present invention may be applied to a case for erecting a simple, linear column-like protrusion 102 on the surface of the flat base material 1 as shown in FIG. 6. In this case, an engaging head portion 102b extending in the rotating direction of the pressing roll 22 is molded. This engaging head portion 102b is formed in a hook shape, a flat surface is formed on top thereof like the above described embodiment and the expanding portions are formed on the right and left sides.

Figure 7:
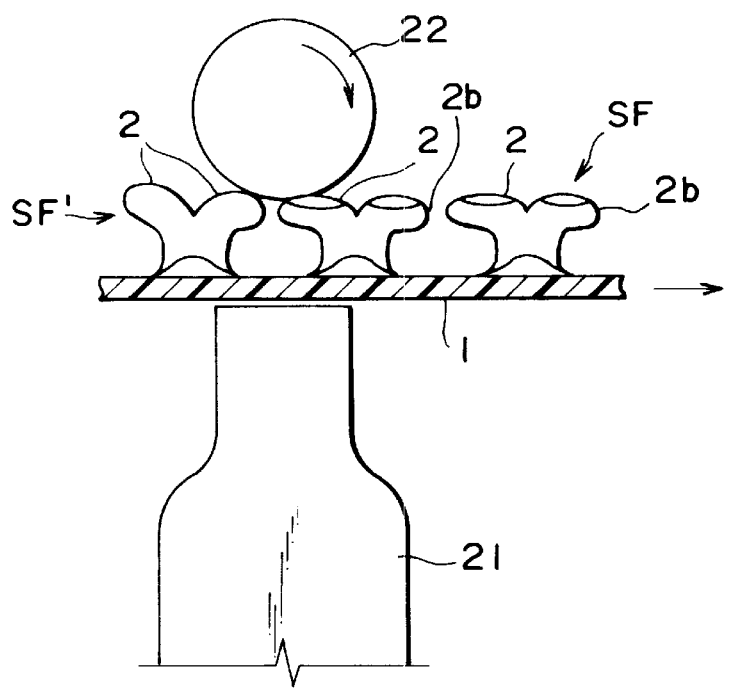
FIG. 7 is a side view showing still another example of the secondary molding process.

In the embodiment shown in FIG. 1, the pressing roll 22 may be rotated in an opposite direction, or positively in a clockwise direction which is an opposite direction to the molding direction as shown in FIG. 7 with an arrow. In this case, the length of the engaging head portion 2b extending back is longer than that of the engaging head portion 2b extending forward.

According to the secondary molding apparatus for molding protrusions erected on the surface of a flat base material of the present invention, the size thereof can be reduced, molding speed may be changed arbitrarily, molding efficiency is high, and no useless heat history is given to other portions than a molded portion. As a result, a very excellent secondary molded product is obtained.

What is claimed is:

1. A secondary molding apparatus comprising:
    a transfer path for a primary molded product having a plurality of protrusions on a front surface of a flat base material thereof;
    an internal heating unit disposed at a predetermined interval below the transfer path so as to come into contact with a rear surface of the flat base material, the internal heating unit configured to melt top portions of the protrusions located on the front surface of the flat base material; and
    a pressing member disposed at the predetermined interval above the transfer path, the pressing member configured to bend the top portions of the protrusions at a desired angle and to press and deform tops of the protrusions into flat surfaces, the pressing member comprising a rotating roller supported by a shaft disposed perpendicular to a direction of crossing the transfer path.

2. The secondary molding apparatus according to claim 1, wherein the internal heating unit is an ultrasonic oscillator or a high frequency oscillator.

* * * * *